UNITED STATES PATENT OFFICE.

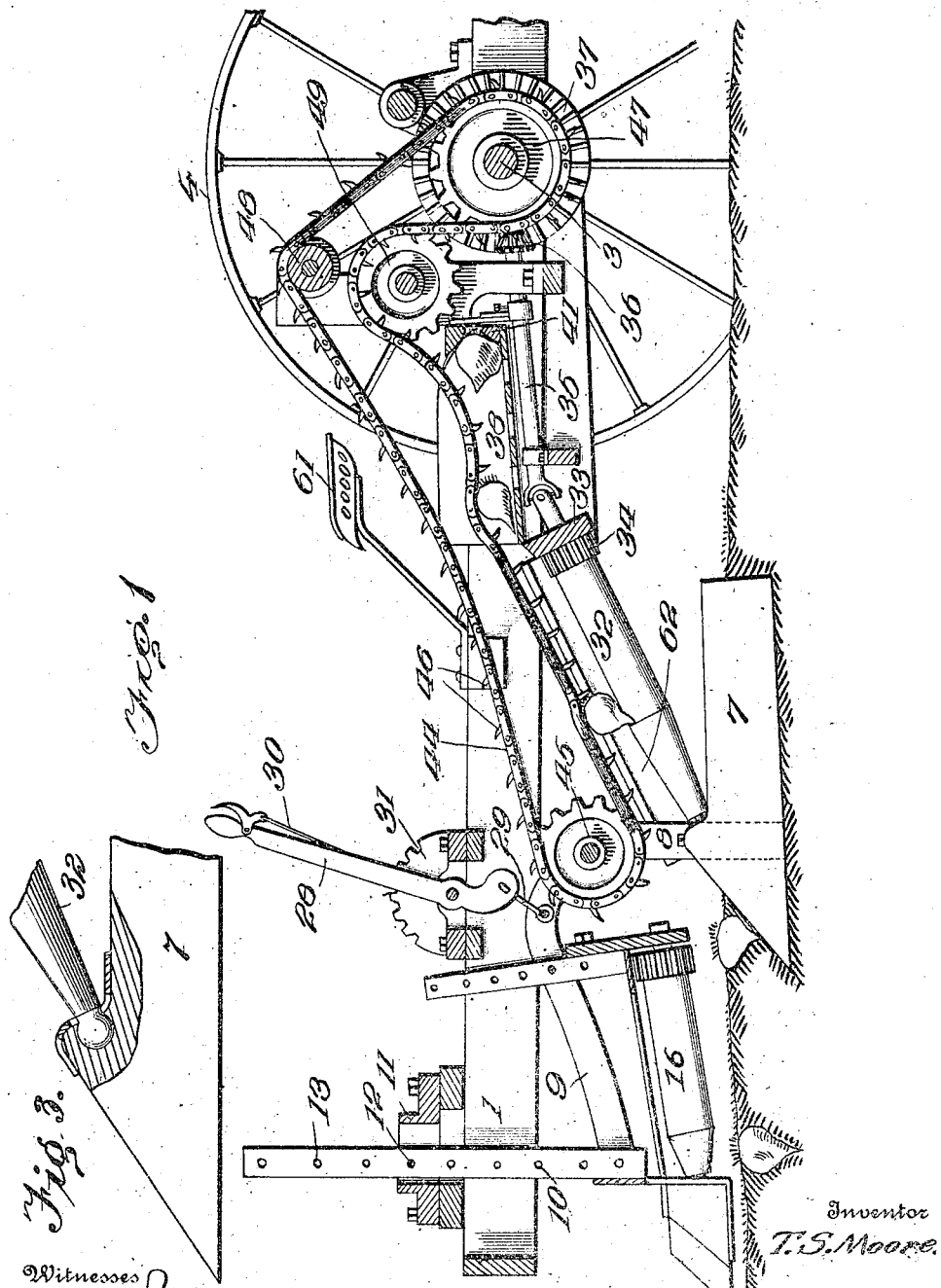

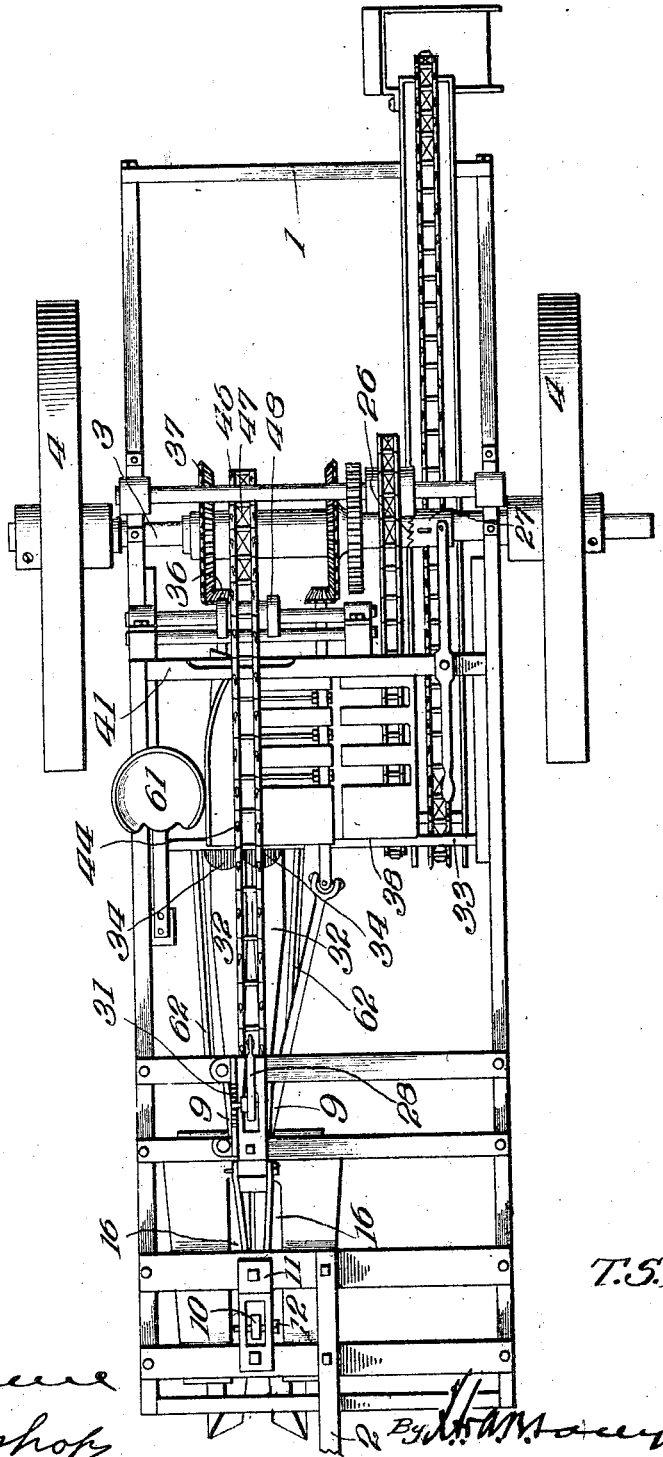

THOMAS S. MOORE, OF SHOSHONI, WYOMING, ASSIGNOR OF ONE-HALF TO MORT WILLIAMS, OF WHEATLAND, WYOMING.

UPROOTING MECHANISM FOR BEET-HARVESTERS.

1,142,049. Specification of Letters Patent. Patented June 8, 1915.

Original application filed October 11, 1913, Serial No. 794,684. Divided and this application filed February 25, 1914. Serial No. 820,941.

*To all whom it may concern:*

Be it known that I, THOMAS S. MOORE, citizen of the United States, residing at Shoshoni, in the county of Fremont and State of Wyoming, have invented certain new and useful Improvements in Uprooting Mechanism for Beet-Harvesters, of which the following is a specification.

This application is a division of an application filed by me October 11, 1913, Serial No. 794,684.

The present invention relates to uprooting mechanism for beet harvesters and has for its object the provision of novel means whereby, as the machine is drawn over the field, the beets will be withdrawn from the ground and brought into position to be directly engaged by a conveyer for delivery at the rear of the machine.

Another object of the invention is to mount the uprooting mechanism in such manner that the beet-engaging members may be adjusted to run at the desired depth.

These stated objects and other objects which will incidentally appear are attained in mechanism of the character illustrated in the accompanying drawings and the invention consists in certain novel features which will be hereinafter first fully described and then particularly pointed out in the claims following the description.

In the drawings, Figure 1 is a longitudinal vertical section of a beet harvester embodying my present improvements, Fig. 2 is a plan view of the same, Fig. 3 is a detail view showing the manner of mounting the lifting roller.

In carrying out my invention, I employ a frame 1 which may be of any convenient dimensions and of any preferred detailed construction. This frame is equipped at its front end with a draft pole or tongue 2 and in the sides of the frame is journaled an axle 3 upon which are fitted ground wheels 4 adapted to actuate the axle through the well known escapement devices.

The plows 7, which are designed to run in the ground along the row of plants and at opposite sides of the plants in the row, are secured to and carried by the lower ends of standards 8 which have their upper ends merged into forwardly extending beams 9 and the said beams are secured at their front ends to a hanger 10 which extends upwardly through a slotted bracket or other support 11 secured upon the frame 1 of the machine. This hanger 10 is adjustably secured in the said bracket by a pin 12 inserted through any one of perforations 13 in the hanger and through suitable openings in the sides of the bracket 11, as will be readily understood. The front ends of the beams may thus be adjusted to any desired height and the depth at which the working parts may travel thus regulated. It will be seen at once that this construction provides a very simple means whereby the plows may be lowered to act upon the beets, as shown in Fig. 1, or may be raised so as to travel clear of the surface of the ground, when the machine is not to operate and is being drawn from field to field or being taken to a storehouse. The tops are removed while the beet bodies are in the ground by topping rollers 16 which are arranged in advance of the plows.

The plows 7 will, of course, run directly behind the topping rollers 16 and they may be set to take into the ground to any desired depth by manipulating a lever 28 which is fulcrumed upon the frame above the rear ends of the plow beams 9 and is connected with said beams by a link 29, as shown. This lever is equipped with the usual latch or holding member 30 adapted to engage a segment or rack 31 so that the plows will be held in the position in which they may be set. Above the plows 7, and extending upwardly and rearwardly from the standards 8, are a pair of rollers 32 which are adapted to coöperate with the plows in raising the beet bodies. The front ends of the said rollers are mounted upon the plow standards 8 by ball and socket bearings as shown in Fig. 3 so that the rollers may readily accommodate the vertical movement or adjustment of the plows and the rear ends of the said rollers are journaled in a cross bar 33 of the frame and equipped with intermeshing pinions 34. The rollers are tapered toward their front ends so that they will more readily engage the plants and may accommodate beet bodies of different sizes. One of the rollers 32 has secured to its rear end the front end of a flexible shaft 35 which is journaled in suitable bearings upon the frame of the machine and is fitted at its rear end with a pinion 36 meshing with a gear wheel 37. The said gear wheel 37 is formed upon or secured rigidly to an extended hub which is constructed with a ratchet or clutch face 26, as shown clearly in Fig. 2. A coacting clutch member 27 is splined upon and shiftable longitudinally of the axle in any convenient manner. When the clutch members are not in engagement the machine may travel without actuating the working mechanism and when it is desired to act upon the plants it is necessary only to shift the clutch member 27 into engagement with the clutch hub 26 whereupon the gear wheel 27 will be actuated.

Disposed longitudinally of the machine and above the rollers 32 so as to coöperate therewith is a flexible carrier or chain 44 which is trained around a sprocket 45 journaled upon the plow standards 8 and provided with pairs of teeth or pins 46 upon each of its links. The said chain is actuated by a sprocket wheel 47, secured upon the extended hub of the gear wheel 37, and the intermediate portions of its upper and lower runs are supported and guided by idlers 48 and 49 mounted in any convenient manner upon the frame of the machine above and in rear of the slotted platform 38. As the beet bodies are taken up by the rollers 32, the pins or teeth 46 of the carrier 44 will engage the bodies and force them toward and over the rear ends of the rollers and onto the platform 38 to and against the stop 41 which will arrest the travel of the beets and cause the carrier to release the same. The beets are subsequently removed from the platform.

It is thought the operation of my improved machine will be readily understood from the foregoing description taken in connection with the accompanying drawings. As the machine is drawn along the row of plants the topping rollers 16 will pull the tops from the plants. The continued forward travel of the machine will then bring the plows 7 under the beets and at opposite sides of the same, so that the beets will be caused to ride up the front inclined edges or points of the plows to the front ends of the rollers 32 which will engage the beets as they pass over the upper ends of the plows, and, as these rollers 32 are rotated in opposite directions with their adjacent surfaces moving upwardly, they will impart an upward movement to the beets so that they may be engaged by the pins of the carrier 44. The said carrier will then force the beets onto the platform 38, as previously stated. The rollers and the carrier are all driven positively from the gearing mounted on the axle of the machine so that the beets cannot accumulate at any one point and clog the operation. The dirt which may adhere to a beet as it is uprooted by the plows will drop therefrom as it travels over the rollers 32 and as it is delivered onto the platform 38 and will fall through the space between the rollers and through the slots in the platform.

A seat 61 of the usual form is preferably provided upon the frame, and to prevent loss of beets by slipping of the same laterally over the rollers 32, I preferably employ guards 62 extending from the plow standards 8 to the bar 33 of the frame, but these guards are not indispensable and may be omitted if desired.

Other changes may be made in the minor details of construction and arrangement of parts without departing from the spirit of the invention as the same is defined in the following claims.

What I claim is:

1. In a beet harvester, the combination of a supporting frame, plow beams carried thereby, means for adjusting the plow beams vertically, and lifting rollers having their rear ends journaled upon the frame and their front ends loosely connected with the plows.

2. In a beet harvester, the combination of a main frame, plow beams disposed below the front end of the frame, plows carried by the rear ends of the plow beams, a lever mounted upon the main frame and connected to the rear ends of the plow beams to support the same, a hanger secured to the front ends of the plow beams and adjustably supported upon the main frame, and lifting rollers connected with and extending upwardly and rearwardly from the plows.

3. In a beet harvester, the combination of a main frame, plow beams suspended from the front end of the main frame, plows carried by the rear ends of said beams, lifting rollers disposed in rear of the plow beams and extending upwardly and rearwardly from the plows, intermeshing pinions on the rear ends of the rollers, a flexible shaft disposed longitudinally of the frame and connected to one of the lifting rollers, and means on the frame acting upon the rear end of said shaft to rotate the same.

4. In a beet harvester, the combination of a supporting frame, plows hung thereon, lifting rollers supported by the plows and frame and extending longitudinally of the same, and guards extending longitudinally of the frame adjacent the rollers.

In testimony whereof I affix my signature in presence of two witnesses.

THOMAS S. MOORE. [L. S.]

Witnesses:
ANTHONY HANSON,
RALPH S. LINN.